(12) United States Patent
Wolf et al.

(10) Patent No.: US 7,591,886 B2
(45) Date of Patent: Sep. 22, 2009

(54) FLUE GAS WASHER WITH A SUPPORTING CONSTRUCTION FOR SPRAY PIPES

(75) Inventors: Hubert Wolf, Meerbusch (DE); Helmut Kanka, Duisburg (DE)

(73) Assignee: Munters Euroform GmbH, Aachen (DE)

( * ) Notice: Subject to any disclaimer, the term of this patent is extended or adjusted under 35 U.S.C. 154(b) by 557 days.

(21) Appl. No.: 10/529,279

(22) PCT Filed: Oct. 5, 2002

(86) PCT No.: PCT/DE02/03776

§ 371 (c)(1),
(2), (4) Date: Aug. 23, 2005

(87) PCT Pub. No.: WO2004/033071

PCT Pub. Date: Apr. 22, 2004

(65) Prior Publication Data

US 2006/0102004 A1    May 18, 2006

(51) Int. Cl.
*B01D 47/14*    (2006.01)
(52) U.S. Cl. .............................. 96/299; 96/300; 96/356
(58) Field of Classification Search ................... 96/322, 96/270–271, 228–232, 355–356; 261/115, 261/118
See application file for complete search history.

(56) References Cited

U.S. PATENT DOCUMENTS

| 2,077,996 | A |   | 4/1937 | Hall ............................. 96/229 |
| 4,157,250 | A | * | 6/1979 | Regehr et al. ................. 96/299 |
| 5,246,471 | A | * | 9/1993 | Bhat et al. ............... 423/242.3 |
| 5,389,127 | A | * | 2/1995 | Wurz et al. .................... 95/281 |
| 5,749,930 | A | * | 5/1998 | Wolf et al. .................... 96/228 |
| 6,102,377 | A | * | 8/2000 | Doughty ..................... 261/117 |
| 6,695,018 | B2 | * | 2/2004 | Johnson et al. ............... 141/70 |

FOREIGN PATENT DOCUMENTS

| CH | 662932 | 11/1997 |
| DE | 3434133 | 1/1986 |
| DE | 3434133 | * 3/1986 |

* cited by examiner

*Primary Examiner*—Duane Smith
*Assistant Examiner*—Ives Wu
(74) *Attorney, Agent, or Firm*—Andrew Wilford

(57) ABSTRACT

Disclosed is a flue gas washer comprising a supporting construction for spray pipes used to clean at least one horizontally arranged droplet separator system. Each droplet separator system comprises droplet separator packets which are mounted on carriers. The supporting construction for the spray pipes is arranged adjacent to or between the droplet separator packets. As a result, inspection and cleaning of the separator systems can be improved significantly.

18 Claims, 8 Drawing Sheets

FLUE GAS WASHER WITH A SUPPORTING CONSTRUCTION FOR SPRAY PIPES

CROSS REFERENCE TO RELATED APPLICATIONS

This application is the US national phase of PCT application PCT/DE2002/003776, filed 5 Oct. 2002, published 22 Apr. 2004 as WO 2004/033071, and claiming the priority of PCT patent application PCT/DE2002/003776 itself filed 5 Oct. 2002, whose entire disclosures are herewith incorporated by reference.

FIELD OF THE INVENTION

The present invention is directed to a flue gas washer with a support structure for spray pipes for cleaning at least one horizontally disposed droplet separator system which is formed by droplet separator packs which are supported on supports.

BACKGROUND OF THE INVENTION

Normally, flue gas washers have at least one coarse separator stage and one fine separator stage which are disposed one above the other on a respective support system with a vertical spacing that allows a manual inspection between the two separator stages. Each separator stage consists of a plurality of identical separator members which are droplet separator packs formed by individual droplet separator lamellae.

Such droplet separator systems have to be periodically cleaned since they contaminate with continuous use. For this, one has incorporated spray pipes into the flue gas washers normally above, below and between the individual droplet separator systems so that they can be sprayed with an appropriate cleaning medium (water) on both sides for cleaning purposes. The spray pipes are carried by support structures which assure a uniform distribution of the spray pipes over the cross-section of the flue gas washer.

It is known to dispose the support structures for the spray pipes at the supports on which the droplet separator packs are supported. For instance, these support structures are defined by posts extending upwardly and downwardly from the supports and supporting corresponding supporting frames on which the spray pipes are disposed.

Such systems have to be inspected and cleaned periodically in order to maintain the operability of the spray pipes. However, inspections can be carried out only in a difficult manner with such systems since the support structure for the spray pipes consisting of the posts arranged at the supports and the supporting frame for the spray pipes hinders access which has to be carried out near the supports. Accordingly, inspections, especially cleaning processes, which have to be carried out at a point of time necessarily can be carried out only with more difficult circumstances with such systems.

The above-cited difficulties exist always if the support structure for the spray pipes is disposed at the supports for the droplet separator systems since in this manner the space above and below the supports is occupied by the posts and the supporting frames crossing the supports. In many cases these supporting frames are also connected to the washer wall itself so that in this area access is made more difficult also.

Accordingly, in order to arrange the spray pipes in flue gas washers their support structures have to be mounted at the supports for the droplet separator systems and thus at the washer itself. This means an additional effort for the manufacturer of the washer since same has to supply a thoroughly adjusted embodiment with an exact size which has to be considered critically, especially if the support systems have an anti-corrosion coating, for instance a rubber coating.

OBJECT OF THE INVENTION

It is the object of the present invention to provide a flue gas washer of the cited kind which can be inspected in an especially simple manner.

SUMMARY OF THE INVENTION

According to the invention this object is achieved with a flue gas washer of the cited kind by the feature that the support structure for the spray pipes is disposed at or between the droplet separator packs.

The decisive difference of the inventive solution with respect to the above-cited prior art consists in the feature that the support structure for the spray pipes is not directly connected to the construction of the flue gas washer, for instance the supports thereof, but is rather disposed at or between the droplet separator packs and is also installed together with same. This has the advantage that the manufacturer of the flue gas washer does not have to take into consideration the mounting of the support structure for the spray pipes or provide his system with such a support structure but that the support structure can be provided with the spray pipes when the droplet separator system or droplet separator systems are installed. Accordingly, the support structure forms a component of the separator system.

The space above and below the supports for the supporting of the droplet separator packs is kept free by the inventive shifting of the support structure to the separator system and the mounting of same at or between the individual droplet separator members or droplet separator packs. Accordingly, the support structure is shifted to the space between the supports whereby access passages for inspection purposes are provided above and below the supports which are not interrupted by posts or support elements running in transverse direction. The height of these access passages is determined by the distance between the supporting systems for the droplet separator systems.

The supports, which are supported on the individual separator packs which form the separator systems, are normally double-T-beams (H-beams) or hollow profiles on the upper flanges of which the individual separator packs are located. According to the prior art the space between adjacent separator packs was used for mounting the vertical posts so that the space above the supports could no more be traveled. According to the invention now the support structure is shifted away from the support to the left and to the right so far that a sufficiently large free space is formed in the space above and below the support which enables access to the system for inspection purposes. The support structure is carried by the separator packs themselves or is disposed between same (if a plurality of separator packs are arranged between adjacent supports) so that, in the last cited case, they are carried by the separator system consisting of the plurality of separator packs. Of course, the separator packs are formed or connected to one another in such a manner that they can carry the support structure.

With such embodiments according to which the support structure for the spray pipes is disposed at the droplet separator packs preferably the droplet separator packs have reinforced end portions for the carrying the support structure. These reinforced end portions do not have to extend over the whole width of the droplet separator packs but can form only a part thereof. Preferably, the reinforced end portions are formed in a box-like manner.

According to this embodiment the reinforced end portions are appropriately penetrated by at least one rod-like post wherein the post, which is provided for the support structure of the spray pipes, can extend on one side or on both sides upwardly and/or downwardly out of the reinforced end portions (boxlike portions) of the droplet separator packs.

Preferably, the support structure for the spray pipes is formed by a spray pipe carrying member by means of which a plurality of posts, especially two, are connected to one another. So, for instance, a droplet separator pack with reinforced end portions can be provided between two adjacent supports wherein both reinforced end portions are penetrated by a respective post which extends upwardly and downwardly and wherein the two posts are connected by a carrying member above and below on which, for instance, two spray pipes are disposed which extend parallel with respect to the supports. Of course, the posts are fixed at the reinforced end portions of the droplet separator packs so that, on the whole, a stable good bearing formation is generated.

According to another embodiment the rod-like posts consist of several parts and have a connecting point outside of the reinforced end portion. Here, for instance, a post extends through the reinforced (box-like) end portion and serves as holding device for further posts extending downwardly and/or upwardly and holding the carrying members for the spray pipes. For instance, the posts can be screwed with one another.

If possible, one can also desist from the post penetrating the reinforced end portions so that the posts are fastened only at the outside of the reinforced (box-like) end portions, for instance through flanges which are provided there.

According to still another embodiment the reinforced end portions are formed in such a manner that rod-like posts can be inserted into same. Here the reinforced (box-like) end portion has a slot at the upper side, for example, through which the post is inserted. In its interior the end portion has an appropriate reception device for the post.

Preferably, the posts are formed in a rod-like manner, i.e. they have no great extension in the direction parallel with respect to the supports. For this suitable flat profiles can be used. The small extension in the direction parallel with respect to the supports has the advantage that an inspection of the separator packs is possible from the access passages above and below the supports.

Preferably, the separator packs are provided with the reinforced end portions directly by the manufacturer so that a one-part formation results. However, it is not excluded that the reinforced end portions are mounted to the separator packs by means of removable or not-removable connections.

Of course, not all the droplet separator packs have to be provided with reinforced end portions. If, for instance, three or more separator packs are disposed between adjacent supports only the two packs adjacent to the supports can be reinforced at their end portions adjacent to the supports while the central pack is formed normally and the two central end portions of the two outer packs are not reinforced either. It is essential that only those separator packs carrying the support structure for the spray pipes have reinforced end portions or only one reinforced end portion.

It was already mentioned that the reinforced end portions preferably extend only over a part of the width of the separator packs. So, same are preferably centrally disposed with respect to the width of the packs while normal lamellae of the separator pack are disposed on both sides of the reinforced (box-like) portion. Accordingly, the reinforced end portions form a reinforced or stiffened core suitable for carrying the support structure.

According to another embodiment of the invention the support structure is formed by posts which are disposed between adjacent droplet separator packs respectively. This embodiment is used if between two adjacent supports two or more droplet separator packs are provided which are connected with one another by means of suitable connection means, for instance flange connections. According to the invention here the post is disposed at the connection point between two droplet separator packs and is connected to the adjacent packs so that same commonly carry the post. Of course, it is also possible according to the invention to provide two short droplet separator packs instead of one long pack and to install a post at the connection point between same.

Preferably, the posts are connected to the separator packs by means of flange connections.

According to this embodiment the vertical posts carry the spray pipes preferably directly. However this does not exclude that also in this case carrying members on which the spray pipes are disposed can be provided between posts.

Also in this embodiment the posts are formed in a rod-like manner or have the shape of a slim plate. They can be adapted to the lamellar shape of the packs in the space between the adjacent separator packs, for instance not formed rectilinearly in this space but adapted to the angular or curve-like course of the lamellae.

According to the last cited embodiment normally a reinforcement of the end portions of the droplet separator packs is not necessary. However, such a reinforcement at the end portions between which a post is disposed is not excluded.

Generally, stable and flexible materials, as for instance special steel but also plastics, as glass-reinforced plastics, are used as materials for the support structure. Even the spray pipes can consist of glass-reinforced plastics. In this case one can work with especially large supporting distances which, for instance, are three times larger than with polypropylene.

BRIEF DESCRIPTION OF THE DRAWING

In the following the invention is described by means of examples in connection with the drawing in detail. Of the drawing

SPECIFIC DESCRIPTION

Figure 1:
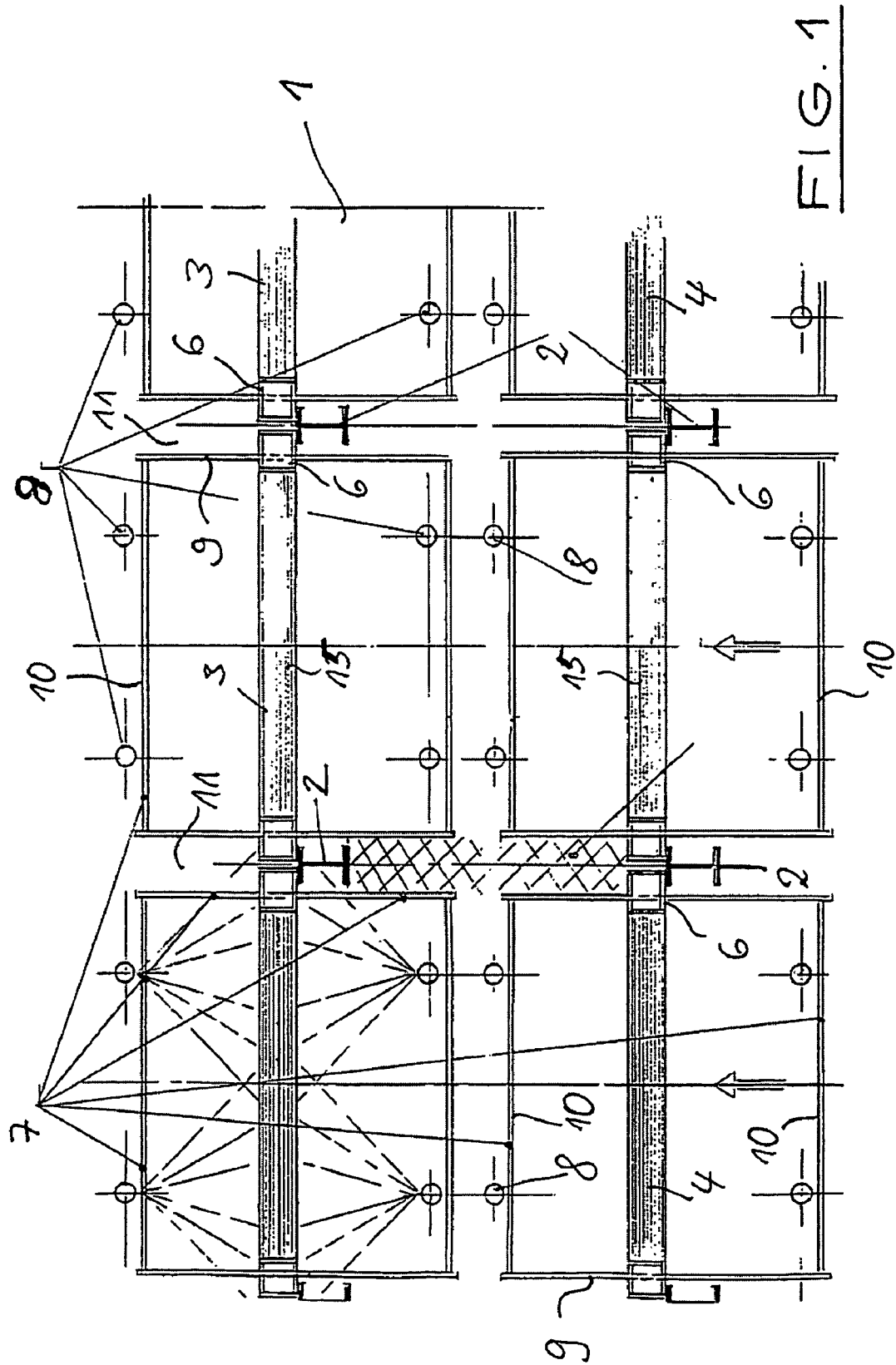
FIG. 1 shows a side view of a part of a flue gas washer.

FIG. 1 shows a vertical section through a part of a flue gas washer 1 which is formed as a standing cylinder. The flow direction of the flue gases is indicated by arrows and extends in FIG. 1 from below to above. In the flue gas washer 1 a lower coarse separator system 4 and an upper fine separator system 3 are disposed which consist of individual droplet separator packs 15. Each droplet separator pack 15 is supported with its end on two supports 2 which extend over the cross-section of the flue gas washer.

Each droplet separator pack 15 consists of a plurality of droplet separator lamellae disposed parallel with respect to another and traversed by the flue gas flow and deflecting the flow of the flue gas flow in order to cause a separation of the entrained droplets in this manner. Such droplet separators are known and do not form part of the present invention.

Each droplet separator pack 15 has in its end portions reinforced box-like portions 6 with which the pack 15 lies on the supports 2. These reinforced end portions 6 carry a support structure 7 for spray pipes extending parallel with respect to the supports 2 and serving for cleaning of the droplet separator systems. The corresponding spraying cones are shown on the left upper side of FIG. 1. The spray pipes 8 are disposed above and below the separator systems 3 and 4 so that the separator packs 15 are cleaned from above and from below.

The support structure 7 has vertical rod-like posts 9 extending through the box-like reinforced end portions 6 and anchored in same inward of the supports 2. Accordingly, these rod-like posts 9 extend upwardly and downwardly from the reinforced end portions 6 and carry at their ends spray pipe carrying elements 10 connecting two posts 9 with one another.

Figure 2:
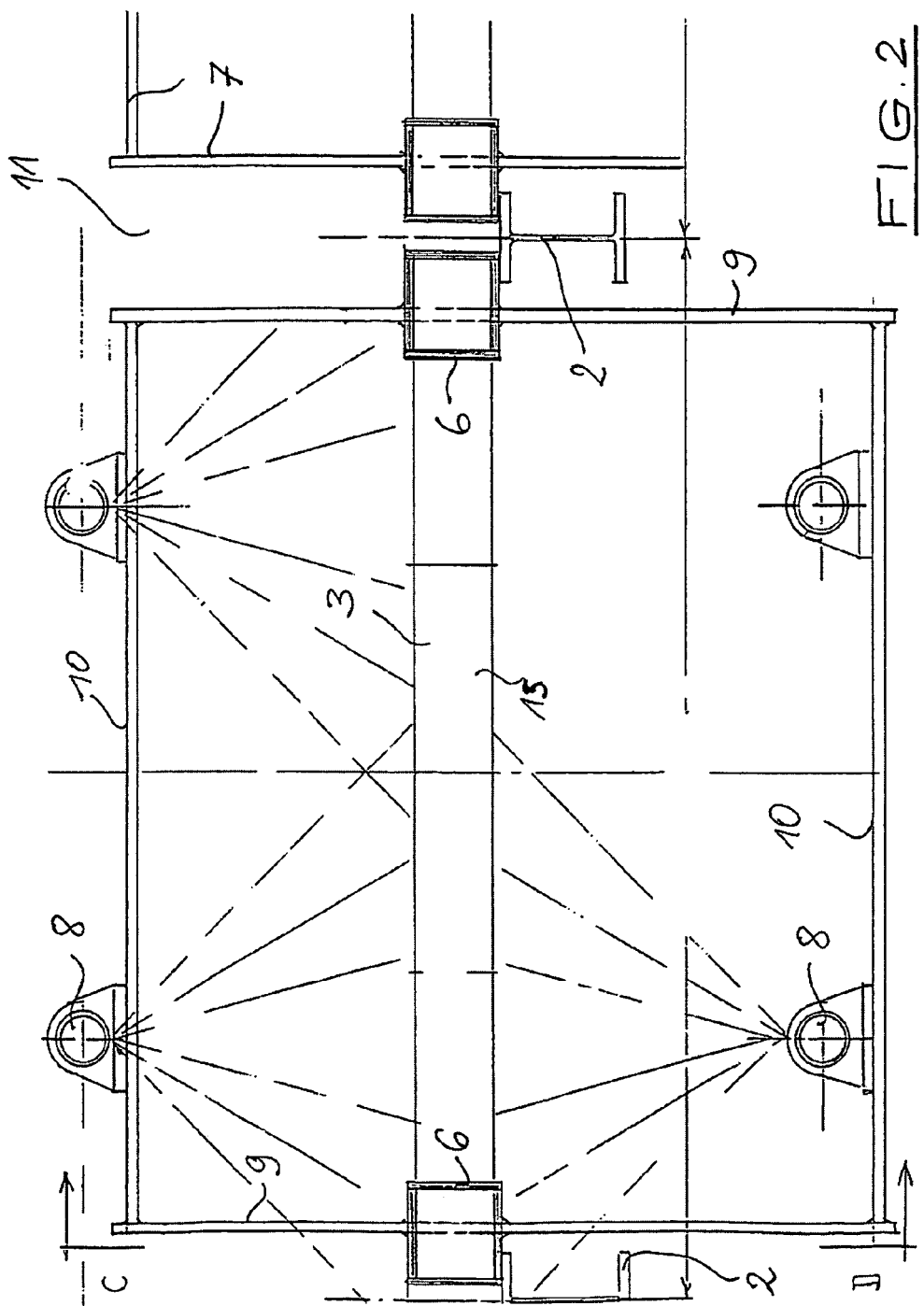
FIG. 2 shows an enlarged view of a part of the flue gas washer of FIG. 1.

FIG. 2 shows the exact design of the support structure for the spray pipes 8. One recognizes that the fine separator system 3 consists of a droplet separator pack 15 lying on two double-T-beams (H-beams) 2. More specifically, the droplet separator pack 15 has two reinforced box-like end portions 6 that bear on the supports. Furthermore, these reinforced end portions 6 serve for the anchoring of respective vertical posts 9 extending upwardly and downwardly from the separator system and provided at their end portions with spray pipe carrying elements 10. As shown in FIG. 2, two spray pipes 8 are located on each spray pipe carrying element 10.

Furthermore, one recognizes from FIG. 2 that access passages 11 for inspections etc. are formed above and below the supports 2 which can be traveled by a service person for inspection purposes etc. Since the posts 9 extend only over a relatively short distance in the direction perpendicular to the view plane inspection of the separator systems 3, 4 from the access passages 11 is possible.

Figure 3:
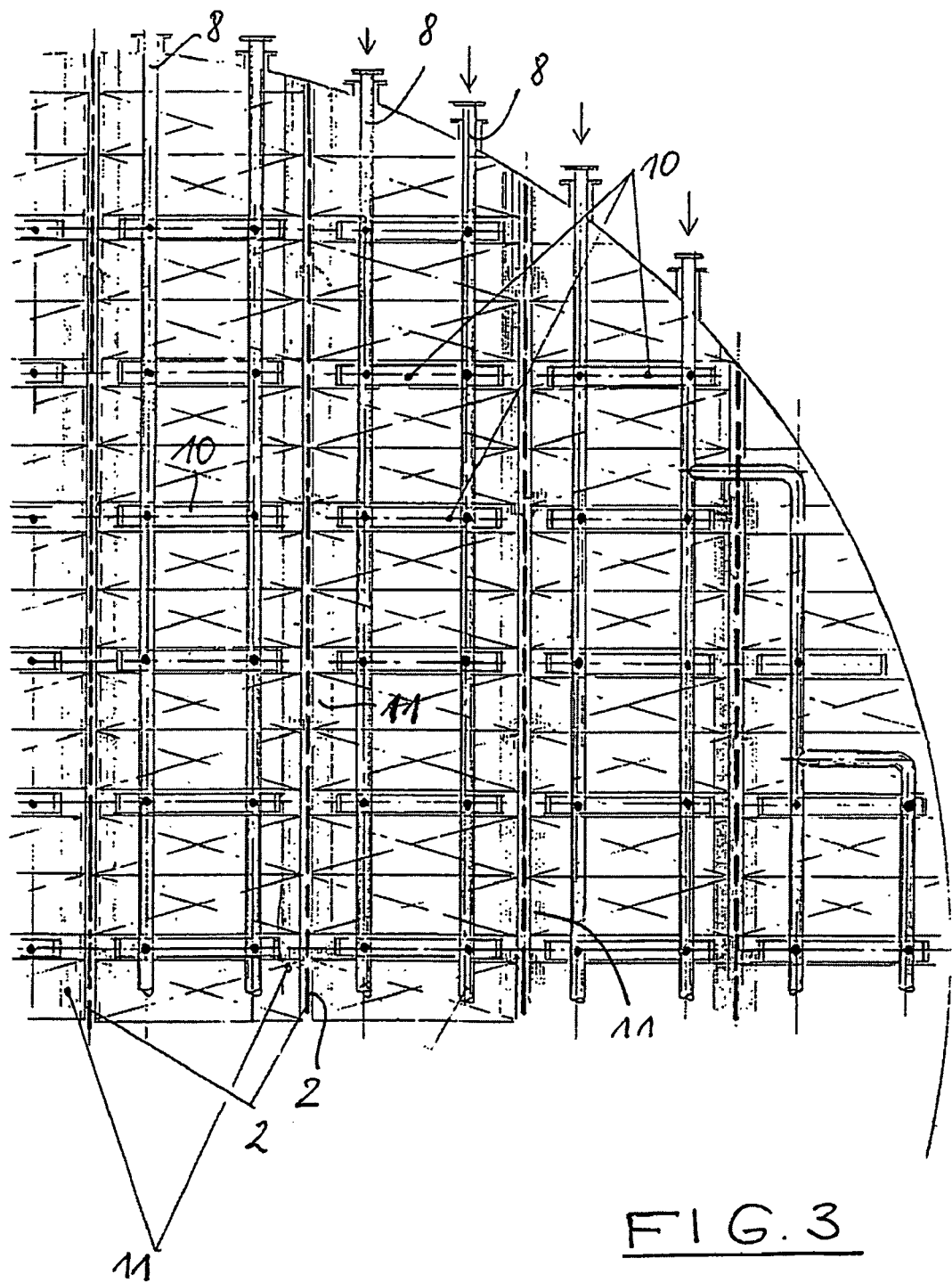
FIG. 3 shows a top view on a part of the flue gas washer of FIGS. 1 and 2 in a reduced scale.

FIG. 3 shows a top view on about a quarter of the cross-section of the flue gas washer 1. One recognizes the access passages 11 formed over the supports 2 which are shown hatched. The spray pipes 8 are located between the supports 2 and are supported on the carrying elements 10, two spray pipes 8 being disposed between two supports 2.

Figure 4:
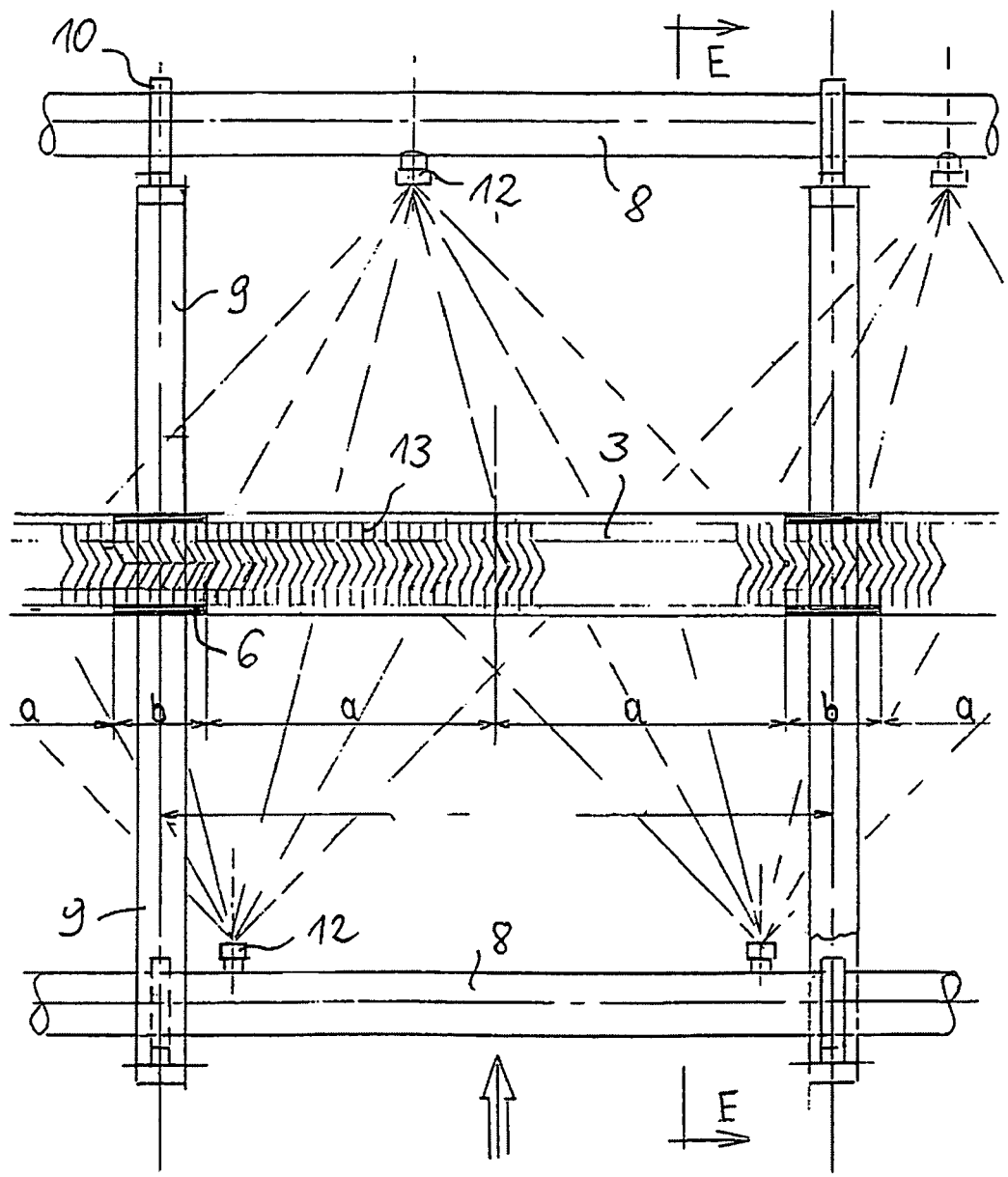
FIG. 4 shows a view of a part of the flue gas washer along line C-D in FIG. 2.

FIG. 4 shows a view of the support structure 7 for the spray pipes 8 in a position turned around 90° with respect to the view of FIG. 2. One recognizes that the vertical posts 9 extend only over a short distance parallel to the plane of the drawing so that they can be anchored in the reinforced box-like portions 6 which are centrally disposed in the end portions of each droplet separator pack 15. It is shown with this embodiment that the separator system 3 consists of a plurality of separator packs 15 of which only several are provided with the reinforced end portions. The remaining packs 15 which do not take over a carrying function for the support structure are formed as normal separator packs 15. The nozzles disposed at the spray pipes 8 are shown at 12 and are spaced from one another in such a manner that their spraying cones overlap so that the whole area of the separator packs 15 can be cleaned. The individual lamellae of the separator packs 15 are indicated at 13.

Figure 5:
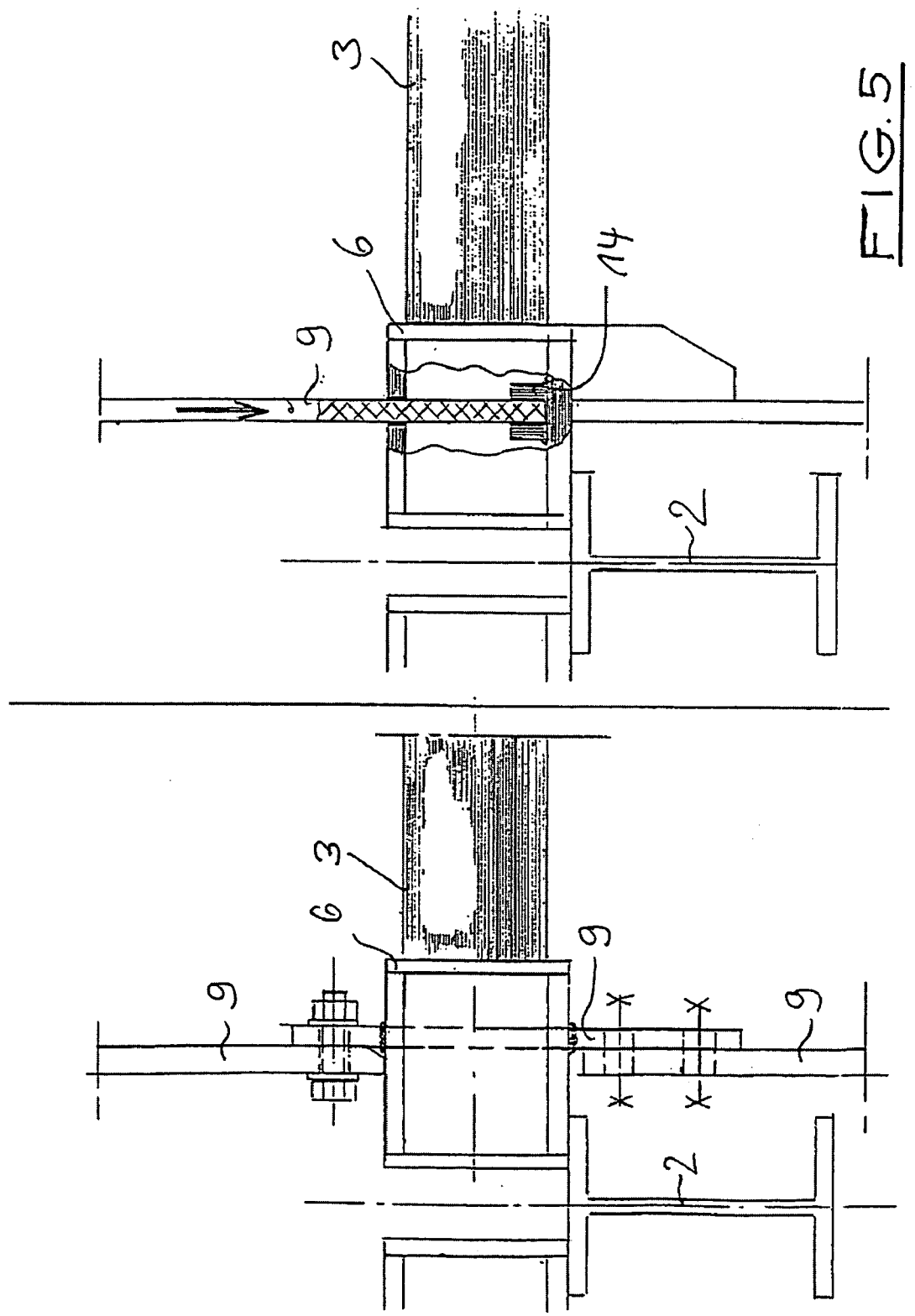
FIG. 5 shows details of the flue gas washer of the preceding figures with other embodiments of the support structure for the spray pipes.

FIG. 5 shows two different variants for fastening the posts 9 in the box-like reinforced end portions 6 of the separator packs 15. According to the left variant one member 9 extends through the reinforced end portion 6 and is welded to same. The post 9 extending through the reinforced end portion 6 forms outside of the reinforced end portion 6 an upper and a lower fastening flange to which two additional posts 9 are screwed and extend upwardly and downwardly and include the carrying elements 10 for supporting the spray pipes 8.

According to the right variant of FIG. 5 one post 9 is inserted into the reinforced box-like end portion 6 and is fixed in same in an appropriate holding construction 14. It extends through a slot on the upper side of the end portion 6 upwardly.

Figure 6:
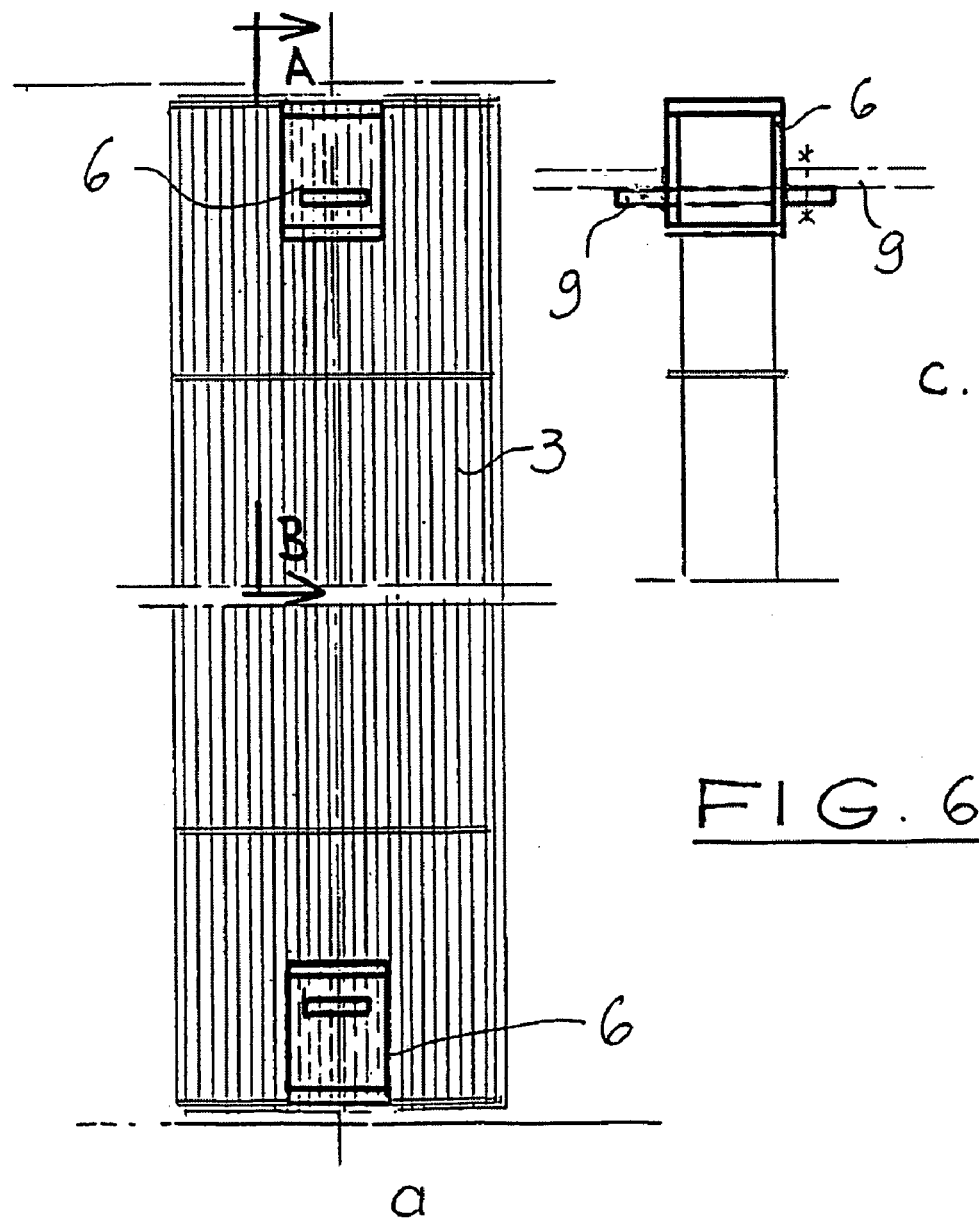
FIGS. 6a, b and c show a top view, a side view and a sectional view along line A-B in FIG. 6a of a droplet separator pack.

FIG. 6a shows a top view of a separator pack 15. This is indicated at 3 and has the reinforced box-like end portions 6 in the center of its end portions. FIG. 6b shows a reinforced box-like end portion 6 in side view with inserted post 9. FIG. 6c shows a side view turned 90°.

Figure 7:
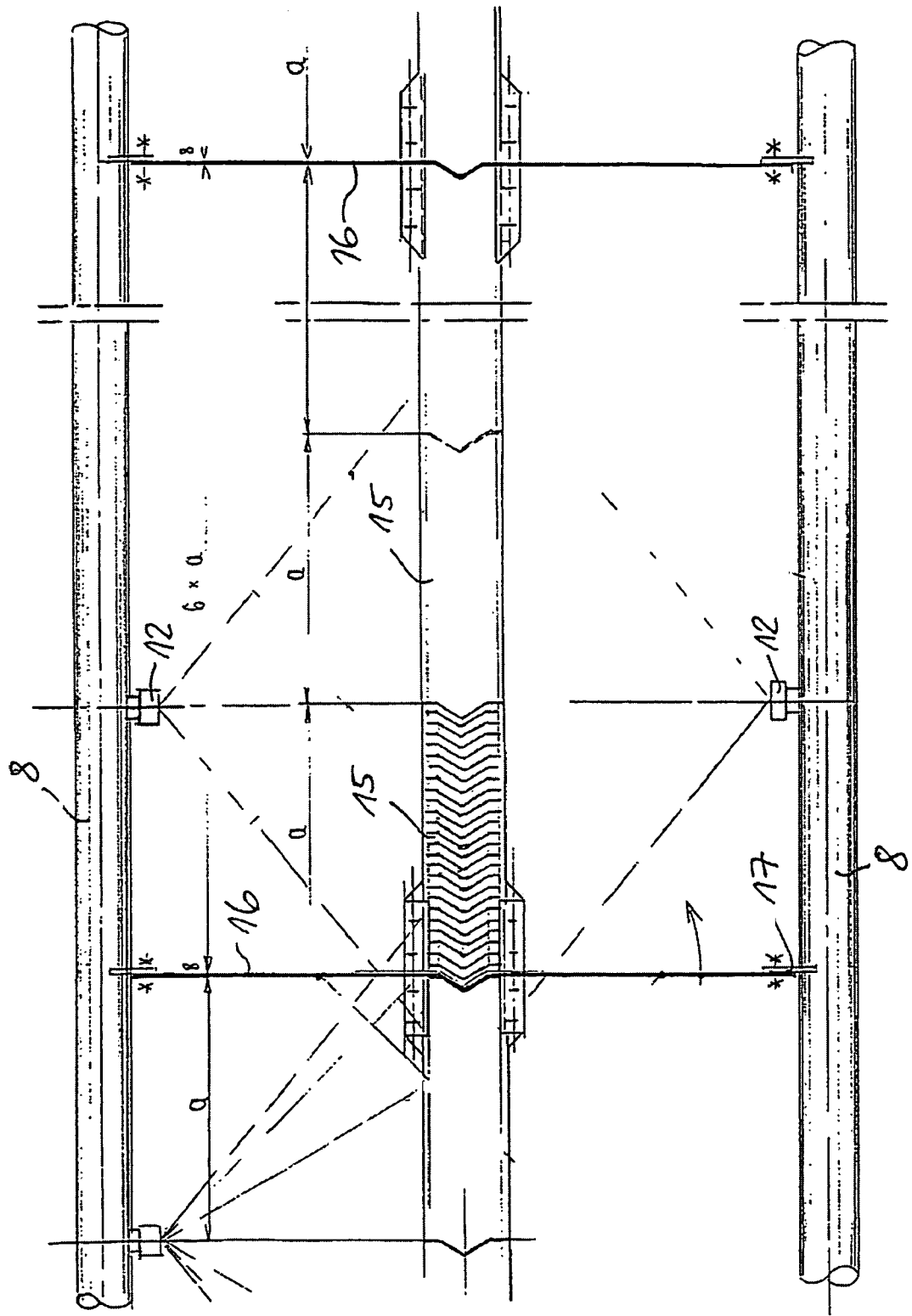
FIG. 7 shows another embodiment of a support structure for spray pipes of a flue gas washer in a side view.

FIG. 7 shows a support structure according to which rod-like posts 16 are not disposed at the separator packs 15 but between same. The rod-like posts 16 carry the spray pipes 8 by means of brackets 17, and corresponding nozzles 12 are mounted on the spray pipes.

Figure 8:
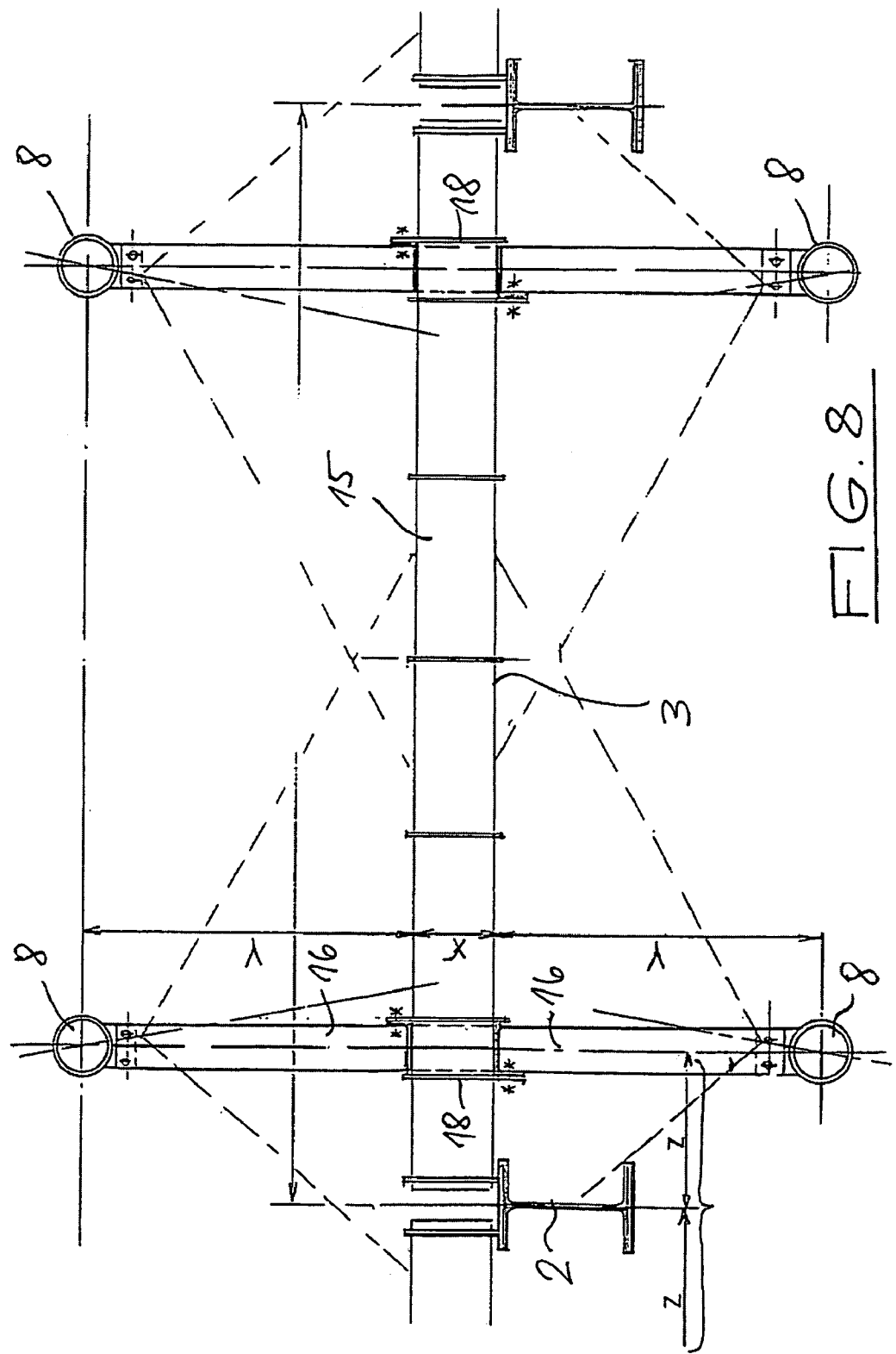
FIG. 8 shows the embodiment of FIG. 7 in a view turned around 90°.

One recognizes in FIG. 8 that the posts 16 extend only slightly perpendicular to the axis of the supports 2 so that also in this case a large free space is available between the posts 16 for inspection purposes. The area above the supports 2 can be traveled. The fastening of the posts 16 between the separator packs 15 is realized by means of appropriate flange connections which are indicated at 18.

The invention claimed is:

1. In a flue-gas washer having horizontally spaced supports, an assembly comprising:
    a horizontally extending droplet-separator pack having ends bearing on the supports;
    posts fixed in and extending upward and downward from the pack inward of the supports and forming clear access passages above the supports between the posts; and
    horizontal spray pipes supported on the posts above and below the packs.

2. The flue gas washer according to claim 1 wherein the droplet separator packs have reinforced end portions for the arrangement of the support structure.

3. The flue gas washer according to claim 2 wherein the reinforced end portions are formed in a box-like manner.

4. The flue gas washer according to claim 2 wherein the reinforced end portions are penetrated by at least one rod-like post.

5. The flue gas washer according to claim 4, characterized in that a plurality of rod-like posts are connected with one another by a spray pipe carrying element.

6. The flue gas washer according to claim 4 wherein the rod-like posts consist of several parts and have a connection point outside of the reinforced end portions.

7. The flue gas washer according to claim 4 wherein one rod-like post or a plurality thereof extend upwardly and downwardly from the reinforced end portion.

8. The flue gas washer according to claim 4 wherein a rod-like post is insertable into a reinforced end portion.

9. The flue gas washer according to claim 1 wherein the support structure is formed by posts which are disposed between adjacent droplet separator packs, respectively.

10. The flue gas washer according to claim 9 wherein the posts are connected to the separator packs through flange connections.

11. The flue gas washer according to claim 9 wherein the posts carry the spray pipes directly.

12. A support structure for use in a flue gas washer according to claim 1.

13. The assembly defined in claim 1 wherein each such pack has a pair of the posts extending upward and a pair of the posts extending downward and each pair of posts carries a respective one of the horizontal spray pipes.

14. The assembly defined in claim 1 wherein the posts are rods fixed to the pack.

15. The assembly defined in claim 1 wherein the pack ends are reinforced and box-shaped.

16. The assembly defined in claim 1 wherein each upper post is aligned vertically with and formed unitarily with the respective lower post from a single vertical rod centrally fixed in the respective pack end.

17. The assembly defined in claim 1 wherein each pack is formed by a plurality of generally vertically extending and horizontally spaced lamellae.

18. The assembly defined in claim 1 wherein each post has an inner end fixed to the respective pack end and an opposite outer end, the assembly further comprising:

respective carrying elements on the outer ends holding the spray pipes.

\* \* \* \* \*